(12) United States Patent
Chen

(10) Patent No.: US 6,184,481 B1
(45) Date of Patent: Feb. 6, 2001

(54) KEY SWITCHES FOR COMPUTER KEYBOARDS

(75) Inventor: S. H. Chen, Taoyuan Hsien (TW)

(73) Assignee: Silitek Corporation, Taipei (TW)

( * ) Notice: Under 35 U.S.C. 154(b), the term of this patent shall be extended for 0 days.

(21) Appl. No.: 08/219,888

(22) Filed: Mar. 30, 1994

(51) Int. Cl.⁷ ..................................................... H01H 13/70
(52) U.S. Cl. ............................ 200/5 A; 200/517; 200/341; 200/345
(58) Field of Search ..................... 200/5 A, 517, 200/341, 345

(56) References Cited

U.S. PATENT DOCUMENTS

| | | | |
|---|---|---|---|
| Re. 30,435 | * 11/1980 | Fukao | 200/159 R |
| 4,609,791 | * 9/1986 | Abbat | 200/5 A |
| 4,733,036 | * 3/1988 | Koizumi et al. | 200/520 |
| 5,066,842 | * 11/1991 | Yamagata et al. | 200/345 |
| 5,372,442 | * 12/1994 | Wang | 400/490 |

* cited by examiner

Primary Examiner—Michael Friedhofer
(74) Attorney, Agent, or Firm—Browdy and Neimark

(57) ABSTRACT

A key switch includes a key base having a rectangular hole at the top, a conductive rubber cone received inside the key base at the bottom and supported on a circuit board, a plunger received in the rectangular hole and having a mounting slot at the top and two unitary spring strips extended from two opposite sides thereof and terminating in a respective hooked portion hooked on a respective retaining groove on the key base from the bottom, and a key cap having a hollow projecting rod fitted into the mounting slot on the plunger for permitting the plunger to be moved downward to trigger an electric contact on the circuit board through the conductive rubber cone upon each striking against the key cap.

3 Claims, 7 Drawing Sheets

KEY SWITCHES FOR COMPUTER KEYBOARDS

BACKGROUND OF THE INVENTION

The present invention relates to computer keyboards, and more particularly to key switches for computer keyboards.

Various key switches have been disclosed for use in computer keyboards. There is known a key switch comprised of a key base, a conductive rubber cone received inside the key base at the bottom and supported on a circuit board and having a rectangular hole above the rubber cone, a key cap mounted on the key base at the top and having a unitary plunger at the bottom inserted into the rectangular hole on the key base. The plunger comprises two opposite guide walls and two opposite locating walls disposed around the four sides, the locating walls respectively terminating in a hooked portion hooked on a respective retaining groove on the key base to limit the upward movement of the plunger within the key base. When the key cap is depressed, the conductive rubber cone is compressed by the plunger of the key cap to trigger a respective electrical contact on the circuit board causing an electrical signal provided to the computer. This structure of key switch is functional, however, the hooked portions of the plunger may be damaged easily when the key cap is frequently removed from the key base for cleaning. Furthermore, because the locating walls are respectively extended from the top of the plunger (inside wall of the key cap), they have a long arm of force, and therefore the hooked portions of the locating walls may be disconnected from the retaining grooves of the key base easily.

SUMMARY OF THE INVENTION

The present invention has been accomplished to provide key switches for computer keyboards which eliminates the aforesaid drawbacks. According to the present invention, the key cap and the plunger are separately made. The plunger is made of a springy material having a mounting slot at the top in the middle, and two spring strips respectively integrally extended downward from two opposite sides thereof in the middle and terminating in a respective hooked portion hooked on a respective retaining groove inside the key base. The key cap has a hollow projecting rod on the inside fitted into the mounting slot causing the plunger fastened to the key cap.

DETAILED DESCRIPTION OF THE PREFERRED EMBODIMENT

Figure 1:
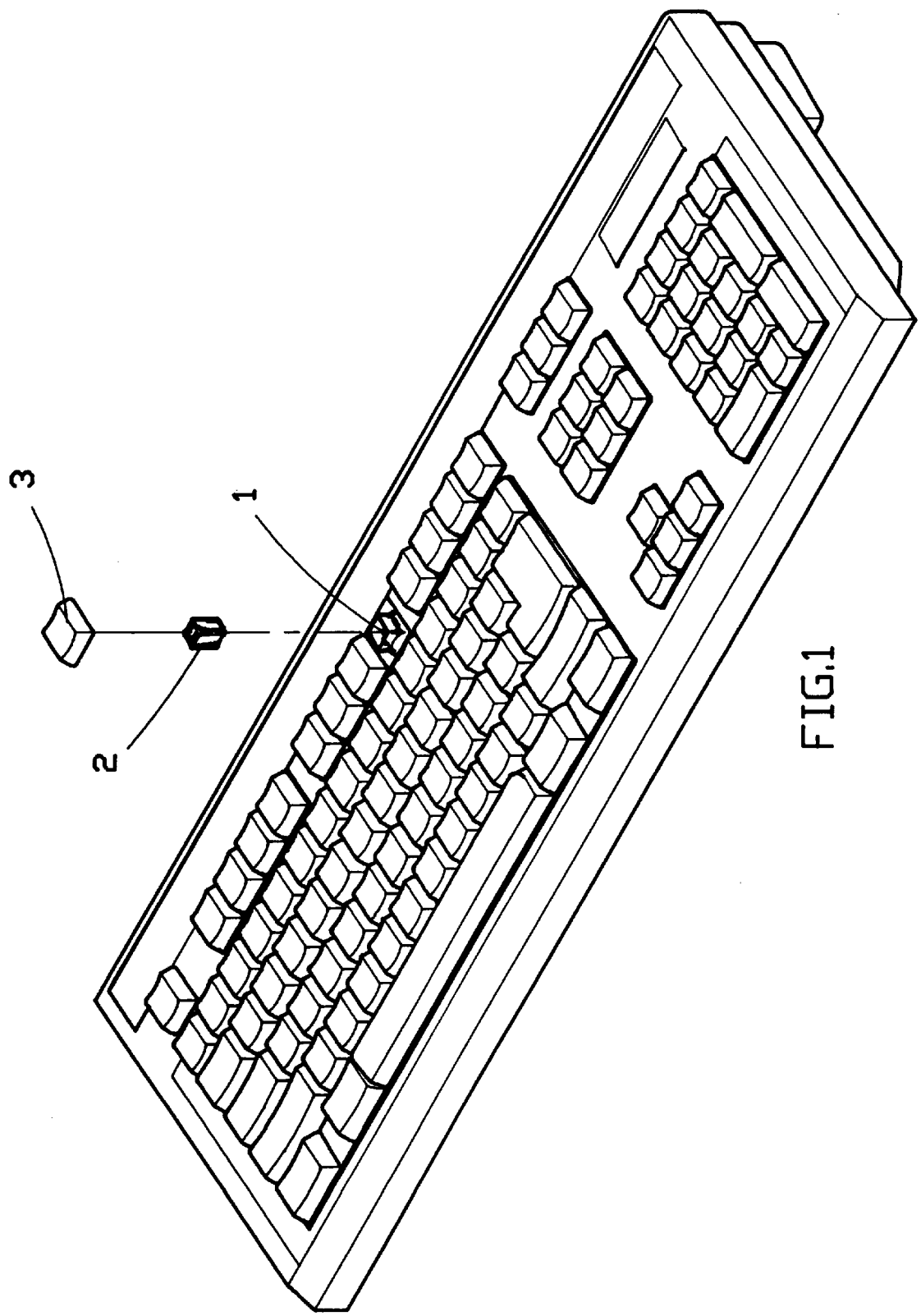
FIG. 1 shows a computer keyboard made according to the present invention.
Figure 2:
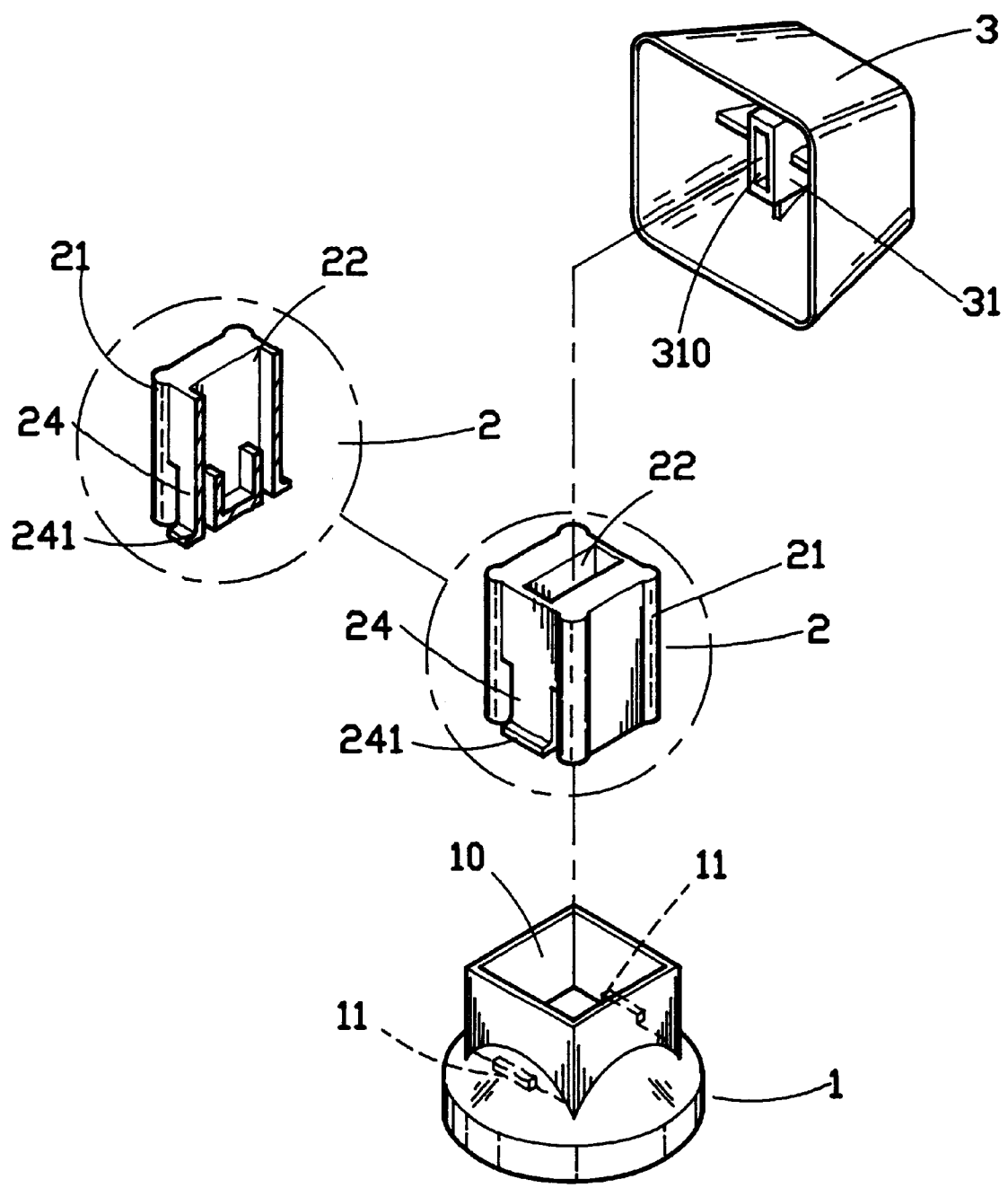
FIG. 2 is an exploded view of a key switch according to the present invention.
Figure 3:
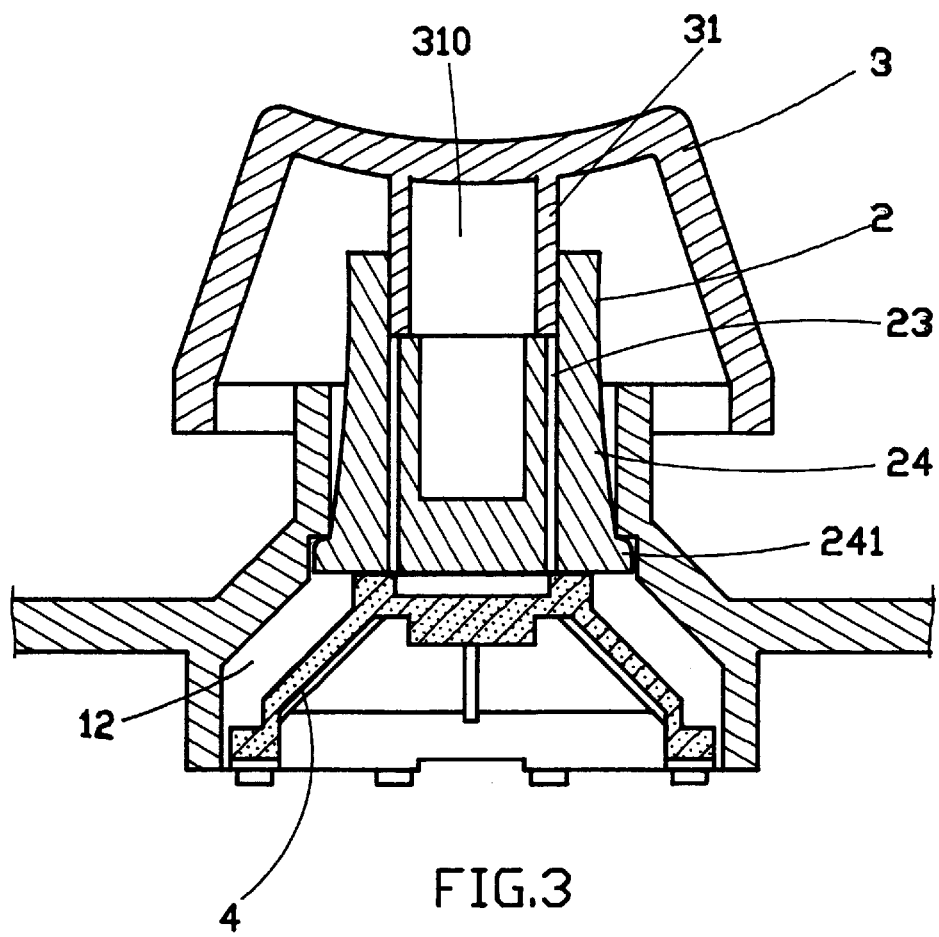
FIG. 3 is a longitudinal view in section of the key switch shown in FIG. 2.
Figure 4:
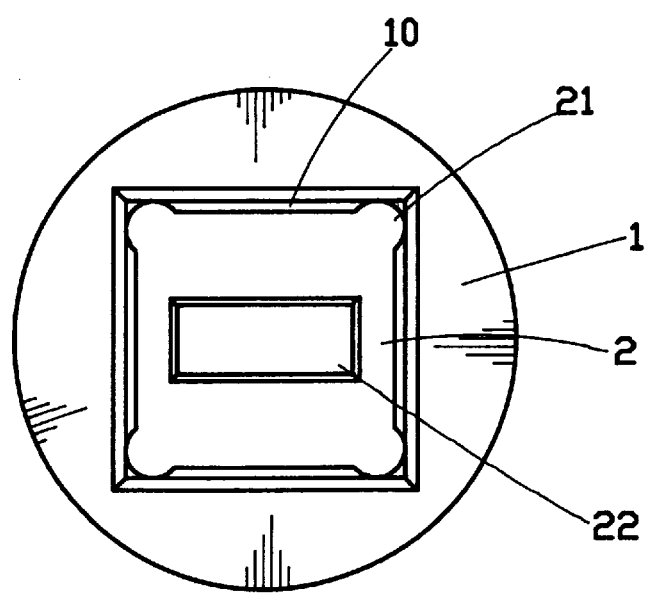
FIG. 4 is a bottom view of the key switch shown in FIG. 2.

Referring to FIGS. 1 through 4, a key switch in accordance with the present invention is generally comprised of a key cap 3, a plunger 2, and a key base 1. The key base 1 is directly integrally made on the frame of the keyboard, having a rectangular hole 10 at the top, which receives the plunger 2, a tapered hole 12 at the bottom, which receives a respective conductive rubber cone 4 (see FIG. 3), two retaining grooves 11 horizontally disposed between the rectangular hole 10 and the tapered hole 12. The plunger 2 is made of resilient plastics in the shape of a quadratic prism having a mounting slot 22 in the middle at the top, four circular ribs 21 raised from the four corners thereof along the length and fitting over the four corners of the rectangular hole 10 of the key base 1, and two unitary spring strips 24 extended from two opposite sides thereof and respectively terminating in a hooked portion 241 hooked on either retaining groove 11 on the key base from the bottom. The key cap 3 is mounted on the key base 1 and covered over the plunger 2 and the rectangular hole 10, having a projecting rod 31 on the inside fitted into the mounting slot 22 on the plunger 2. The projecting rod 31 has a bottom hole 310, which makes the projecting rod 31 flexible, and therefore the projecting rod 31 can be squeezed inwards and then inserted into the mounting slot 22 permitting the plunger 2 to be fastened to the key cap 3.

Referring to FIG. 3 again, when the key cap 3 is depressed, the hooked portions 241 of the two spring strips 24 of the plunger 2 are disconnected from the retaining grooves 11, and therefore the plunger 2 is moved down to compress the conductive rubber cone 4 causing it to trigger the respective contact on the circuit below in producing an electrical signal. When the key cap is released, the plunger 2 is moved back to its former position by the conductive rubber cone 4, and therefore the hooked portions 241 hook on the retaining grooves 11 again.

Figure 5:
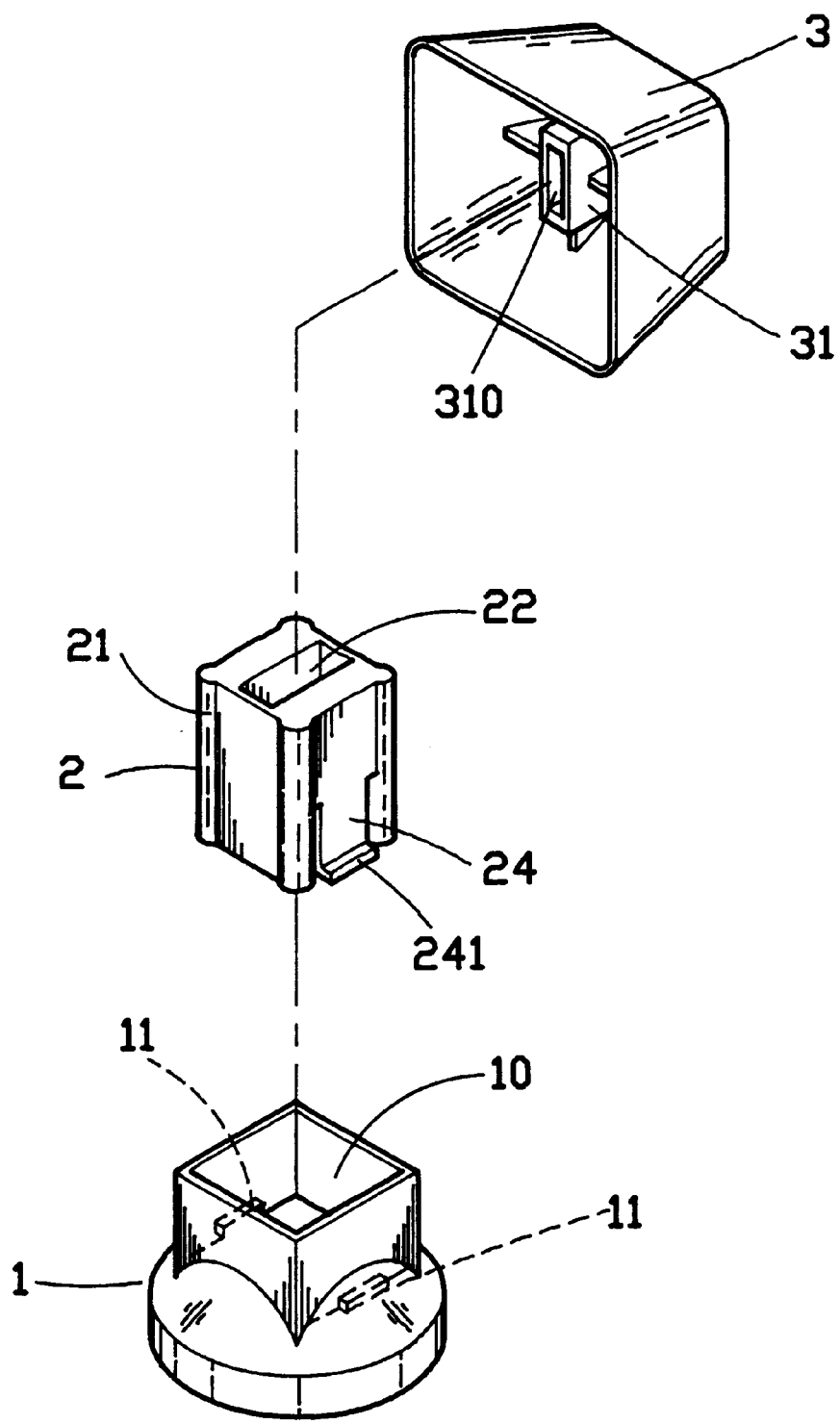
FIG. 5 shows an alternate form of the plunger for the key switch shown in FIG. 2.
Figure 6:
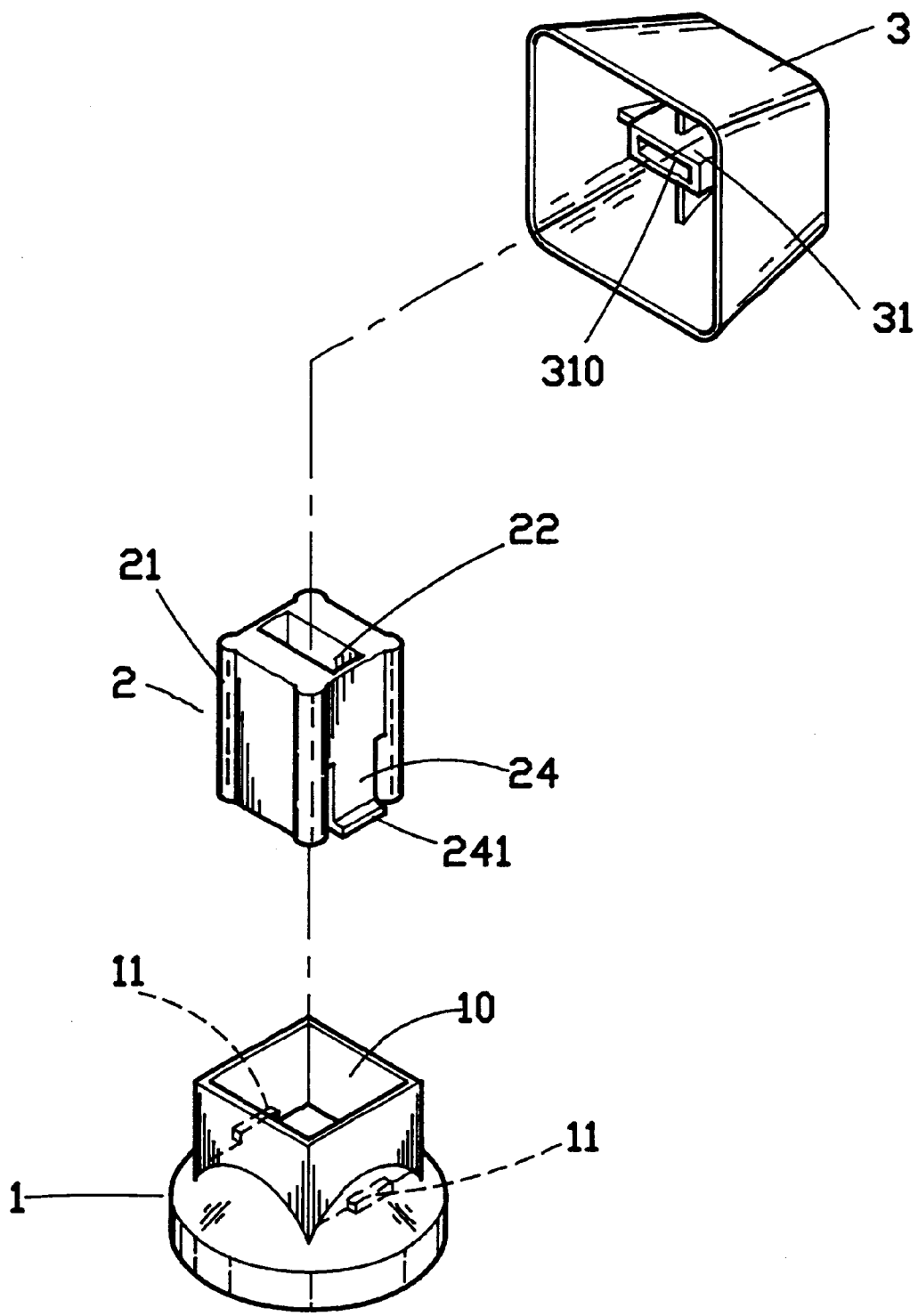
FIG. 6 shows another alternate form of the plunger for the key switch shown in FIG. 2.
Figure 7:
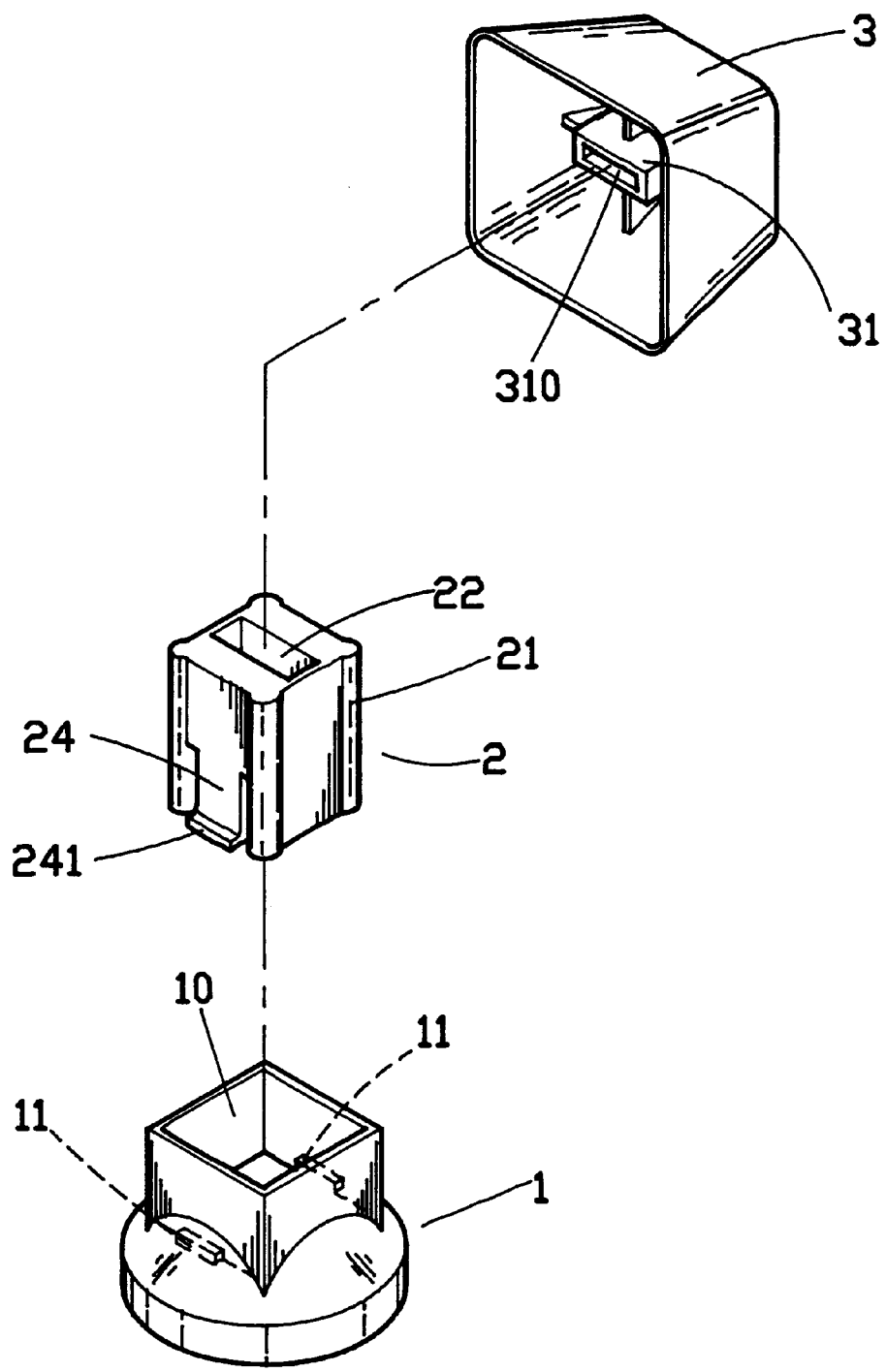
FIG. 7 shows still another alternate form of the plunger for the key switch shown in FIG. 2.

Referring to FIGS. 5, 6, and 7, therein illustrated show different arrangements of the mounting slot 22 and spring strips 24 on the plunger.

Figure 8:
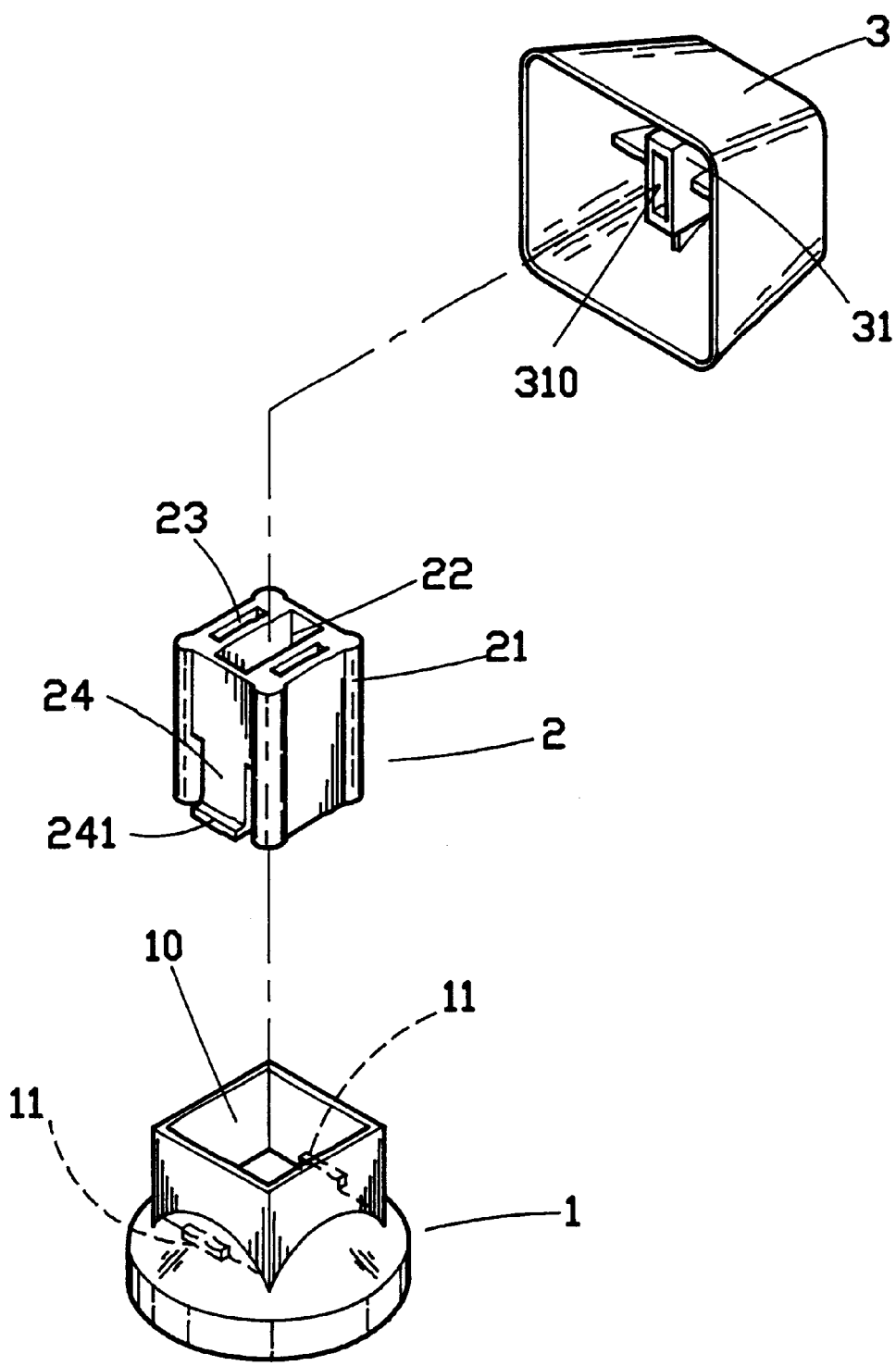
FIG. 8 shows still another alternate form of the plunger for the key switch shown in FIG. 2.

Referring to FIG. 8, two longitudinal through holes 23 may be made on the plunger 2 and disposed at two opposite sides by the mounting slot 22. This arrangement greatly improves the flexibility of the plunger 2 for permitting the projecting rod 31 of the key cap 3 to be conveniently fitted into the mounting slot 22.

While only few embodiments of the present invention have been shown and described, it will be understood that various modifications and changes could be made without departing from the spirit and scope of the invention.

What is claimed is:

1. A key switch of the type comprising
   a key base,
   a respective conductive rubber cone received inside said key base at the bottom and supported on a circuit board and having a rectangular hole above said rubber cone,
   a plunger received inside said rectangular hole and having two spring strips respectively terminating in a respective hooked portion hooked on a respective retaining groove on said key base to limit the upward movement of said plunger within said key base, and
   a key cap fastened to said plunger and depressed to squeeze said plunger against said rubber cone causing it to trigger a respective electrical contact on said circuit board, wherein
   said plunger is made of a springy material and has a mounting slot at the top in the middle;
   said key cap has a hollow projecting rod on the inside fitted into said mounting slot causing said plunger to be fastened to said key cap;

said spring strips are respectively integrally extended downward from two opposite sides of said plunger in the middle; and said plunger further comprises two longitudinal through holes on two opposite sides alongside said mounting slot, said longitudinal through holes each being substantially parallel to a side of said mounting slot.

2. The key switch according to claim 1, wherein the mounting slot is rectangular and the longitudinal through holes each includes a substantially flat side parallel to a respective adjacent side of the mounting slot.

3. The key switch according to claim 2, wherein the plunger is square and the longitudinal through holes are rectangular, such that mounting slot has shorter sides adjacent sides of the plunger and longer sides adjacent the longitudinal through holes.

\* \* \* \* \*